(12) United States Patent
Manzano et al.

(10) Patent No.: US 11,023,002 B1
(45) Date of Patent: Jun. 1, 2021

(54) STYLUS COUPLING SYSTEM

(71) Applicant: Pioneer Square Brands, Inc., Seattle, WA (US)

(72) Inventors: Megan Elizabeth Zumel Manzano, Seattle, WA (US); Michael Cooper Ferren, Camas, WA (US); Brian Lewis Piper, Seattle, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

(21) Appl. No.: 17/011,921

(22) Filed: Sep. 3, 2020

(51) Int. Cl.
*G06F 1/16* (2006.01)
*G06F 3/0354* (2013.01)

(52) U.S. Cl.
CPC ........ *G06F 1/1607* (2013.01); *G06F 3/03545* (2013.01)

(58) Field of Classification Search
CPC ............................ G06F 1/1607; G06F 3/03545
USPC ......................................................... 361/679
See application file for complete search history.

(56) References Cited

U.S. PATENT DOCUMENTS

| | | | | |
|---|---|---|---|---|
| 6,392,639 | B1* | 5/2002 | Lee | G06F 1/1626 345/179 |
| 2006/0269352 | A1* | 11/2006 | Hite | B43K 23/001 401/131 |
| 2008/0123286 | A1* | 5/2008 | Watanabe | G06F 1/1635 361/679.27 |
| 2013/0292530 | A1* | 11/2013 | Dang | G06F 1/1656 248/229.2 |

* cited by examiner

*Primary Examiner* — Kent W Chang
*Assistant Examiner* — Sujit Shah
(74) *Attorney, Agent, or Firm* — Grandview Law

(57) ABSTRACT

Systems and methods are involved with but are not limited to an apparatus including a stylus coupling assembly, which includes a stylus retention component being couplable with a stylus-shaped computer input device and also includes an engagement component being couplable with the stylus retention component and also being couplable with a computing device case portion. In addition, other aspects are described in the claims, drawings, and text forming a part of the present disclosure.

15 Claims, 9 Drawing Sheets

STYLUS COUPLING SYSTEM

SUMMARY

In one or more aspects, an apparatus can include, but is not limited to a stylus coupling assembly to couple at least one stylus-shaped computer input device to at least one computing device case portion, the stylus coupling assembly can include but is not limited to a stylus retention component, which can be couplable with the stylus-shaped computer input device. The stylus coupling assembly can include but is not limited to an engagement component, which can include but is not limited to an engagement projection, the engagement projection can be couplable with the stylus retention component and with the computing device case portion. The stylus retention component can include but is not limited to an elongated hollow member, which can include but is not limited to opening. The opening being sized to receive the stylus-shaped computer input device. The elongated hollow member of the stylus retention component can include but is not limited to an elongated rib member and an interior surface. The elongated rib member can be extended from the interior surface along a longitudinal direction of the elongated hollow member. The elongated hollow member of the stylus retention component can include but is not limited to elongated groove, which can be extended from the interior surface along a longitudinal direction of the elongated hollow member. The stylus retention component can include but is not limited to an interfacial surface and a receiving aperture. The receiving aperture can be extended between the elongated groove of the elongated hollow member and the interfacial surface. The interfacial surface of the stylus retention component can be shaped to conform with a surface of the computing device case portion. The interfacial surface of the stylus retention component can include but is not limited to a substantially planar surface. The engagement component of the stylus coupling assembly can include but is not limited to elongated member. The elongated member can be shaped and sized to be received by the elongated groove of the stylus retention component. The elongated member of the engagement component can include but is not limited to an elongated surface. The interior surface of the elongated hollow member can include but is not limited to a radius of curvature. The elongated surface of the elongated member can include but not limited to a first radius of curvature. The interior surface of the elongated hollow member can include but is not limited to a second radius of curvature, the first radius of curvature of the elongated surface of the elongated member can be substantially equal to the second radius of curvature of the interior surface of the elongated hollow member. The elongated member of the engagement component can include but is not limited to a first longitudinal length dimension. The elongated member can be shaped to extend substantially along the first longitudinal length dimension. The engagement component can include but is not limited to engagement projection. The engagement projection can extend from the elongated member along a second length dimension substantially perpendicular to the first longitudinal length dimension of the elongated member. The receiving aperture of the stylus retention component can be sized and shaped to receive the engagement projection to extend through the receiving aperture along a third longitudinal length dimension of the receiving aperture. The second longitudinal length dimension of the engagement projection can be greater than the third longitudinal length dimension of the receiving aperture to allow for a portion of the engagement projection to extend past the interfacial surface of the stylus retention component. The engagement projection can be configured to couple with the computing device case portion.

The engagement projection of the engagement component can include but is not limited to stem and can include but is not limited to notch. The notch can extend substantially perpendicularly from the interfacial surface of the elongated member along a length dimension greater than or equal to the third longitudinal length dimension of the receiving aperture. The engagement projection of the engagement component can include but is not limited to stem, which can include beveled end with orthogonal extension being perpendicular to the stem. The stylus retention component can be made from material having a property of hardness that can be measured to be a first hardness measurement value. The engagement component can be made from material having a property of hardness that can be measured to be a second hardness measurement value, the first hardness measurement value can be smaller than the second hardness measurement value. The stylus retention component can be made from silicone material and the engagement component can be made from polycarbonate material. The stylus retention component can include but is not limited to an interfacial surface and guide aperture. The guide aperture can be extended a first length dimension between the elongated groove of the elongated hollow member and the interfacial surface. The engagement component can include but is not limited to elongated member and guide peg. The guide peg can extend longitudinally from the elongated member a second length dimension. The first length dimension of the guide aperture can be greater than or equal to the second length dimension of the guide peg. The guide aperture can be sized and positioned to receive the guide peg as the stylus retention component is being coupled with the engagement component. The elongated hollow member is substantially cylindrical in shape.

In one or more aspects, an apparatus can include, but is not limited to a stylus retention component for coupling with stylus-shaped computer input device and for coupling with an engagement component. The engagement component can include engagement projection. The stylus retention component can include an elongated hollow member, which can include but is not limited to opening, which can be sized to receive the stylus-shaped computer input device. The interior surface can include but not limited to elongated groove. The receiver portion can include but is not limited to receiving aperture and an interfacial surface. The receiving aperture can extend between the elongated groove of the elongated hollow member and the interfacial surface of the elongated hollow member. The receiving aperture can be sized to receive the engagement projection of the engagement component. The stylus retention component can be made from silicone material.

In one or more aspects, an apparatus can include, but is not limited to an engagement component for coupling with a stylus retention component and for coupling with stylus-shaped computer input device. The stylus retention component can include an elongated hollow member and a receiver portion. The elongated hollow member can include an opening and an interior surface. The interior surface can include an elongated groove. The receiver portion can include an interfacial surface and receiving aperture, which can extend from the elongated groove of the elongated hollow member to the interior surface of the receiver portion. The engagement component can include but is not limited to an elongated member, which can include but is not limited to elongated surface and an interfacial surface. The elongated member can extend substantially along a first longitudinal length dimension. The elongated member can be sized and shaped to be received by the elongated groove of the elongated hollow member. The engagement component can include but is not limited to an engagement projection, which can extend from the elongated member along a second length dimension substantially perpendicular to the first longitudinal length dimension of the elongated member. The engagement projection can be sized and shaped to be received by and extend through the receiving aperture of the stylus retention component. The engagement component can be made from polycarbonate material.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of a stylus coupling assembly-based articles of manufacture, compositions of matter, systems for producing and/or methods for producing same that may provide context, for instance, in introducing one or more processes and/or devices described herein.

DETAILED DESCRIPTION

Figure 1:
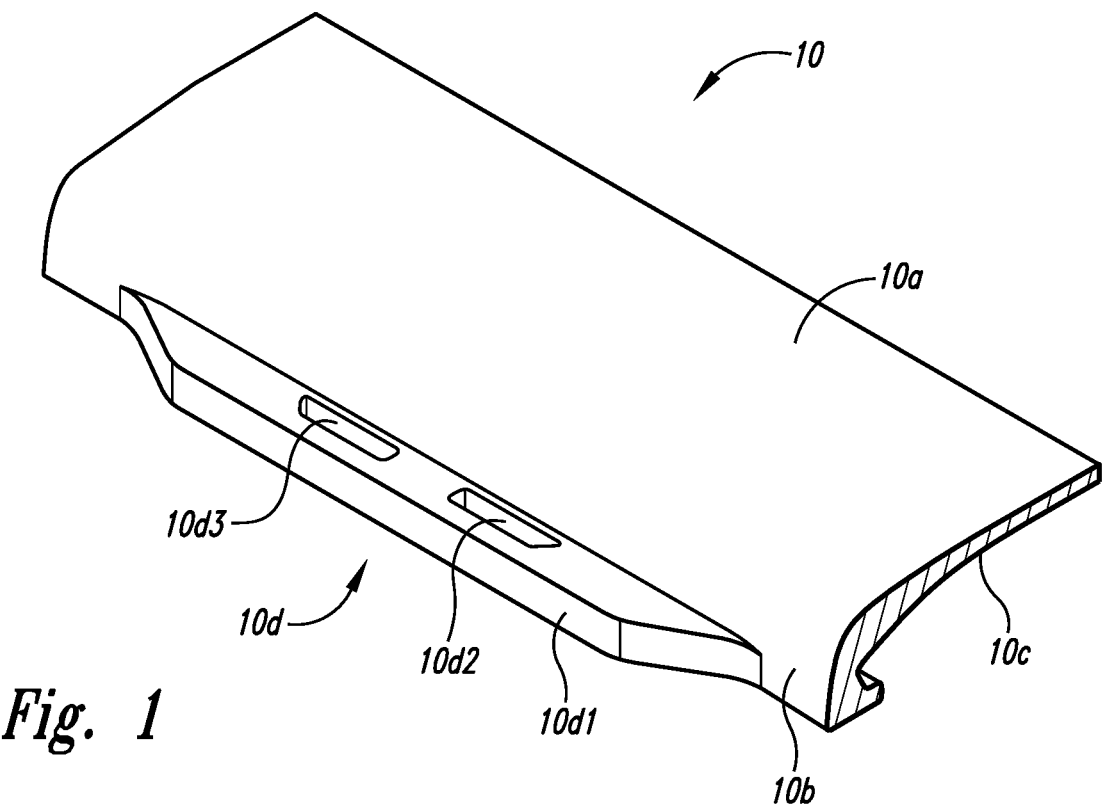
FIG. 1 is a top perspective view of a computing device case portion.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a top perspective view of a computing device case portion 10.

The computing device case portion 10 is shown to include exterior cover surface 10a, exterior side surface 10b, interior surface 10c, connection portion 10d, and engagement projection 18e.

The connection portion 10d of the computing device case portion 10 is shown to include connection ledge 10d1, connection aperture 10d2, and connection aperture 10d3.

Figure 2:
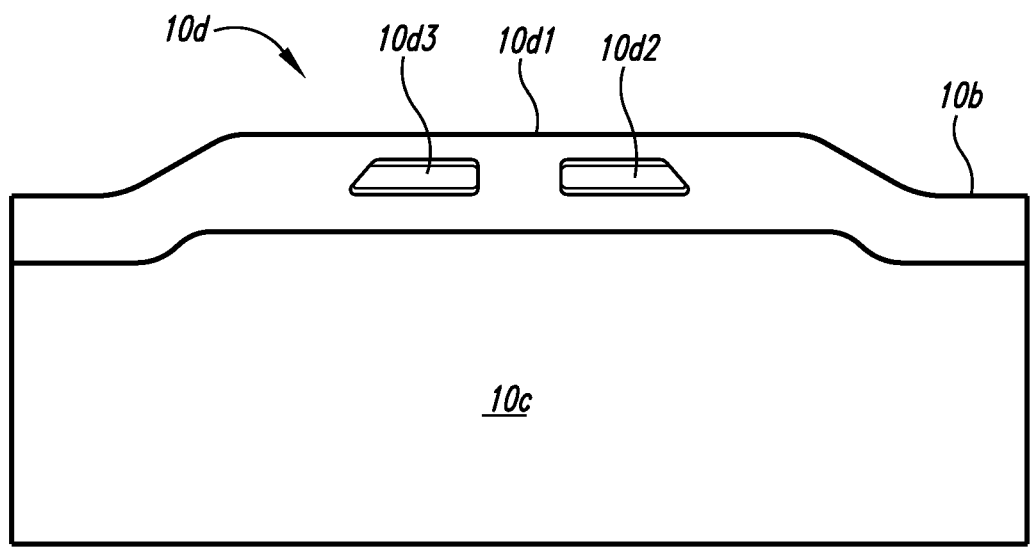
FIG. 2 is a bottom view of the computing device case portion of FIG. 1.

Turning to FIG. 2, depicted therein is a bottom view of the computing device case portion 10 of FIG. 1.

Figure 3:
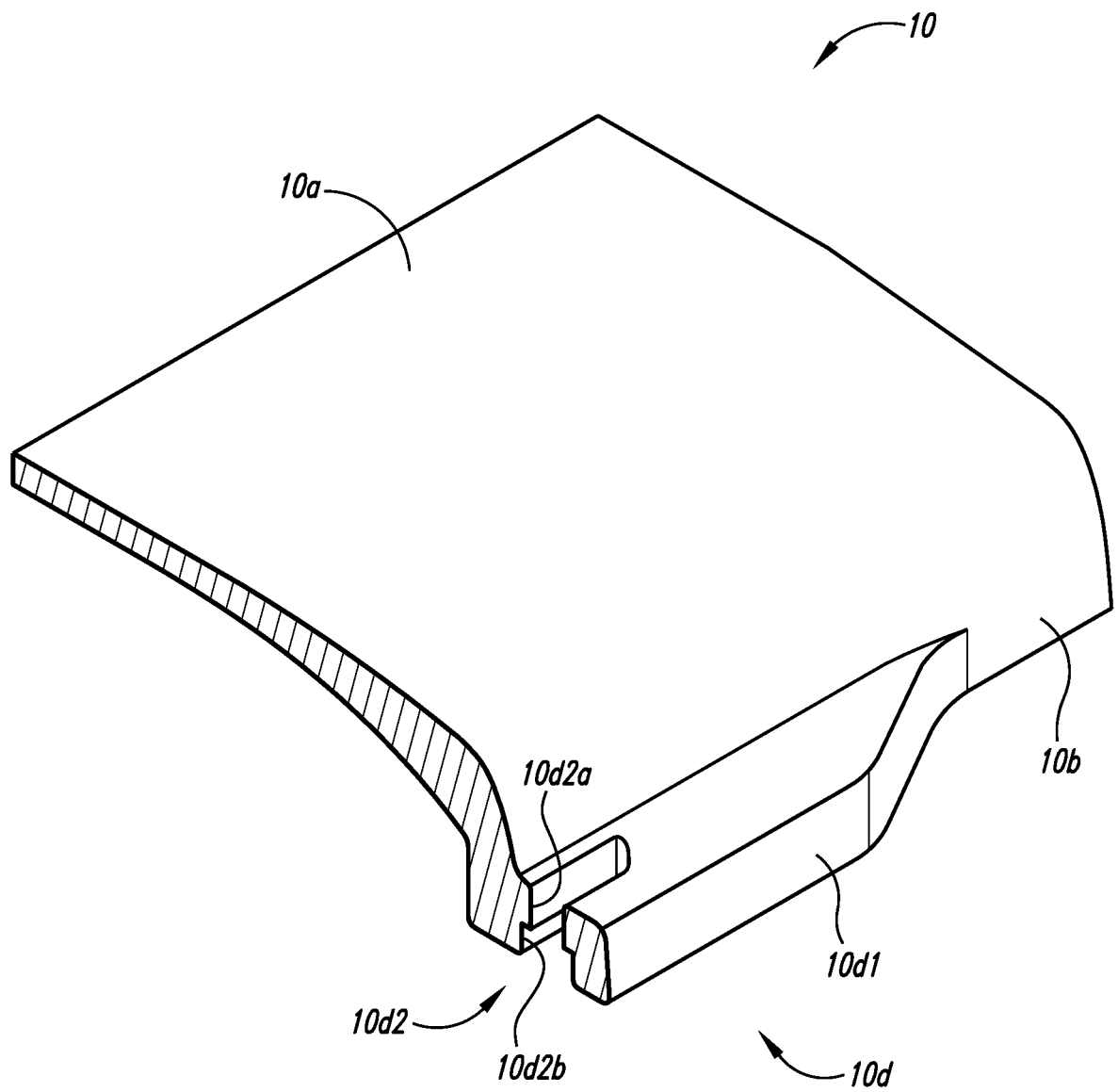
FIG. 3 is a sectional top perspective view of the computing device case portion of FIG. 1.

Turning to FIG. 3, depicted therein is a sectional top perspective view of the computing device case portion 10 of FIG. 1.

The connection aperture 10d2 of the connection portion 10d of the computing device case portion 10 is shown to include narrow passage 10d2a and wide passage 10d2b.

Figure 4:
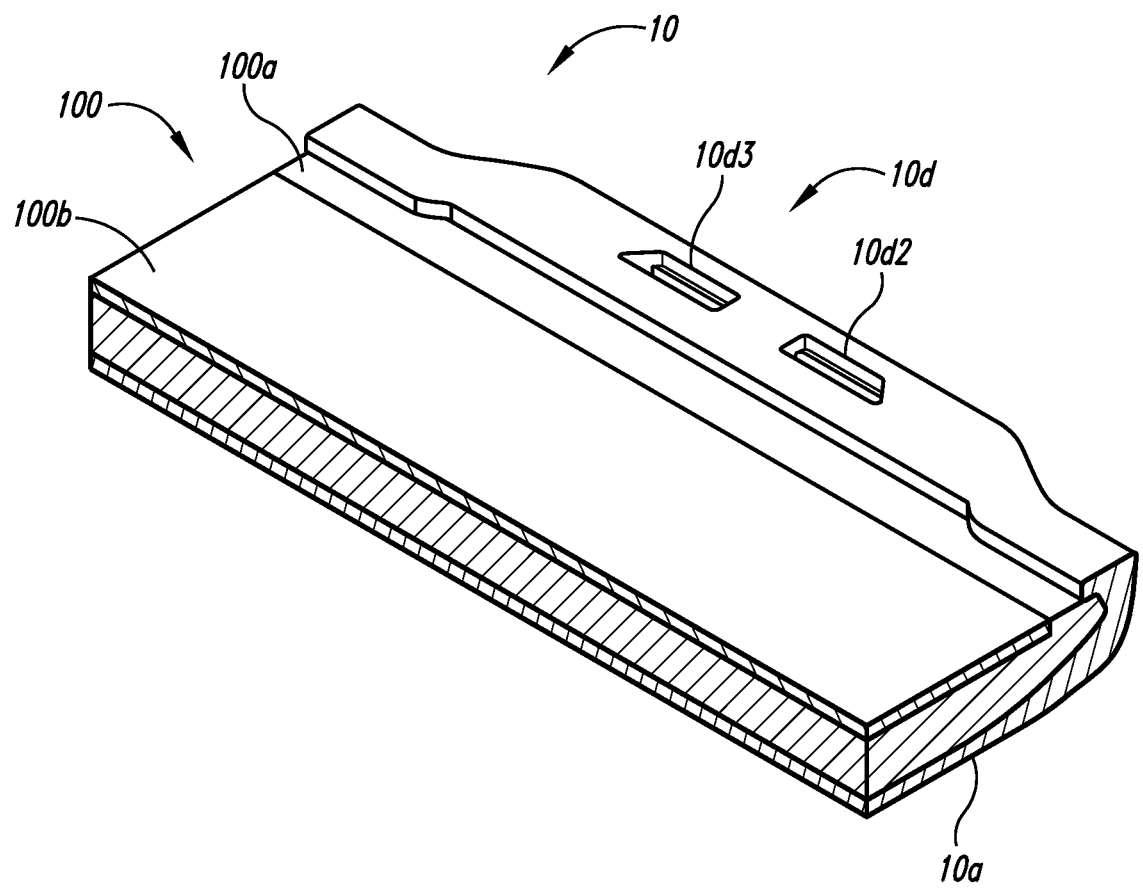
FIG. 4 is a bottom perspective view of the computing device case portion of FIG. 1.

Turning to FIG. 4, depicted therein is a bottom perspective view of the computing device case portion 10 of FIG. 1.

The computing device case portion 10 is shown to be couplable with a portable electronic computing device 100, which includes a peripheral border 100a and an exterior surface 100b.

Figure 5:
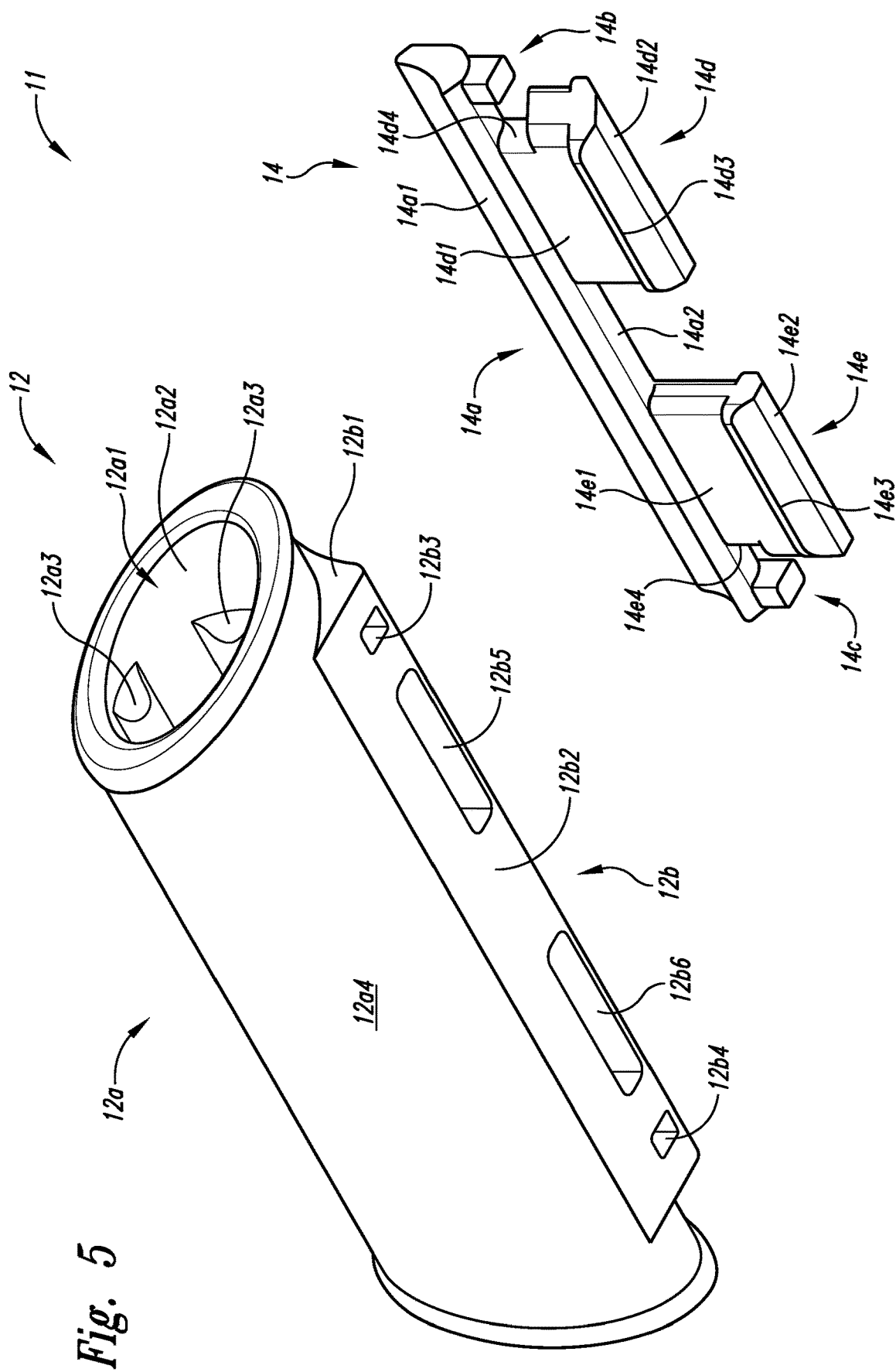
FIG. 5 is a bottom perspective view of a stylus coupling assembly including a stylus retention component and an engagement component.

Turning to FIG. 5, depicted therein is a bottom perspective view of a stylus coupling assembly 11 shown to include a stylus retention component 12 and an engagement component 14.

The stylus retention component 12 of the stylus coupling assembly 11 is shown to include elongated hollow member 12a and receiver portion 12b.

The elongated hollow member 12a of the stylus retention component 12 of the stylus coupling assembly 11 is shown to include opening 12a1, interior surface 12a2, elongated rib member 12a3, and exterior surface 12a4.

The receiver portion 12*b* of the stylus retention component 12 of the stylus coupling assembly 11 is shown to include contoured extension 12*b*1, interfacial surface 12*b*2, guide aperture 12*b*3, guide aperture 12*b*4, receiving aperture 12*b*5, and receiving aperture 12*b*6.

The engagement component 14 of the stylus coupling assembly 11 is shown to include elongated member 14*a*, guide peg 14*b*, guide peg 14*c*, engagement projection 14*d*, and engagement projection 14*e*.

The elongated member 14*a* of the engagement component 14 of the stylus coupling assembly 11 is shown to include elongated surface 14*a*1 and interfacial surface 14*a*2.

The engagement projection 14*d* of the engagement component 14 of the stylus coupling assembly 11 is shown to include stem 14*d*1, beveled end 14*d*2, orthogonal extension 14*d*3, and notch 14*d*4

The engagement projection 14*e* of the engagement component 14 of the stylus coupling assembly 11 is shown to include stem 14*e*1, beveled end 14*e*2, orthogonal extension 14*e*3, and notch 14*e*4.

Figure 6:
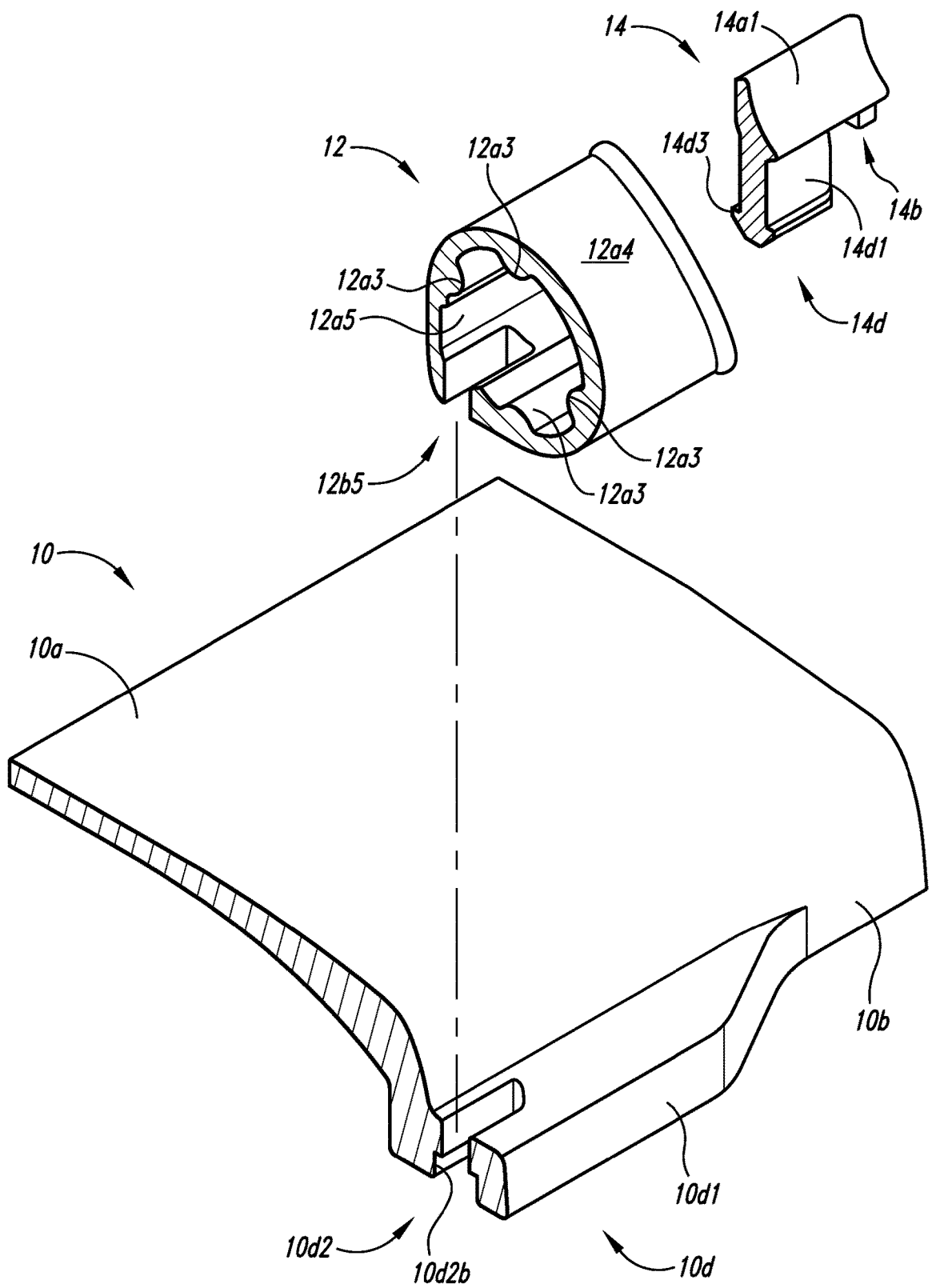
FIG. 6 is a sectional top perspective view of the stylus coupling assembly including the engagement component to be coupled with the stylus retention component and to be coupled with the computing device case portion.

Turning to FIG. 6, depicted therein is a sectional top perspective view of the stylus coupling assembly 11 shown to include the engagement component 14 to be coupled with the stylus retention component 12 and to be coupled with the computing device case portion 10.

The elongated hollow member 12*a* of the stylus retention component 12 of the stylus coupling assembly 11 is shown to include elongated groove 12*a*5.

Figure 7:
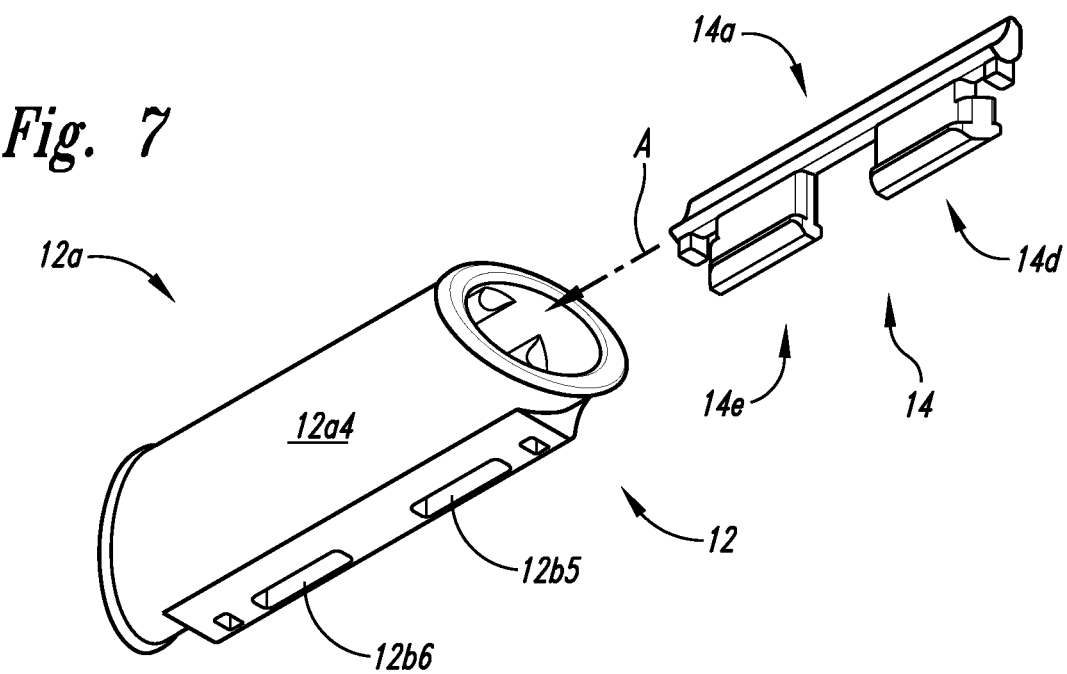
FIG. 7 is a bottom perspective view of the stylus coupling assembly including the stylus retention component and the engagement component to be coupled together.

Turning to FIG. 7, depicted therein is a bottom perspective view of the stylus coupling assembly 11 shown to include the stylus retention component 12 and the engagement component 14 to be coupled together.

Figure 8:
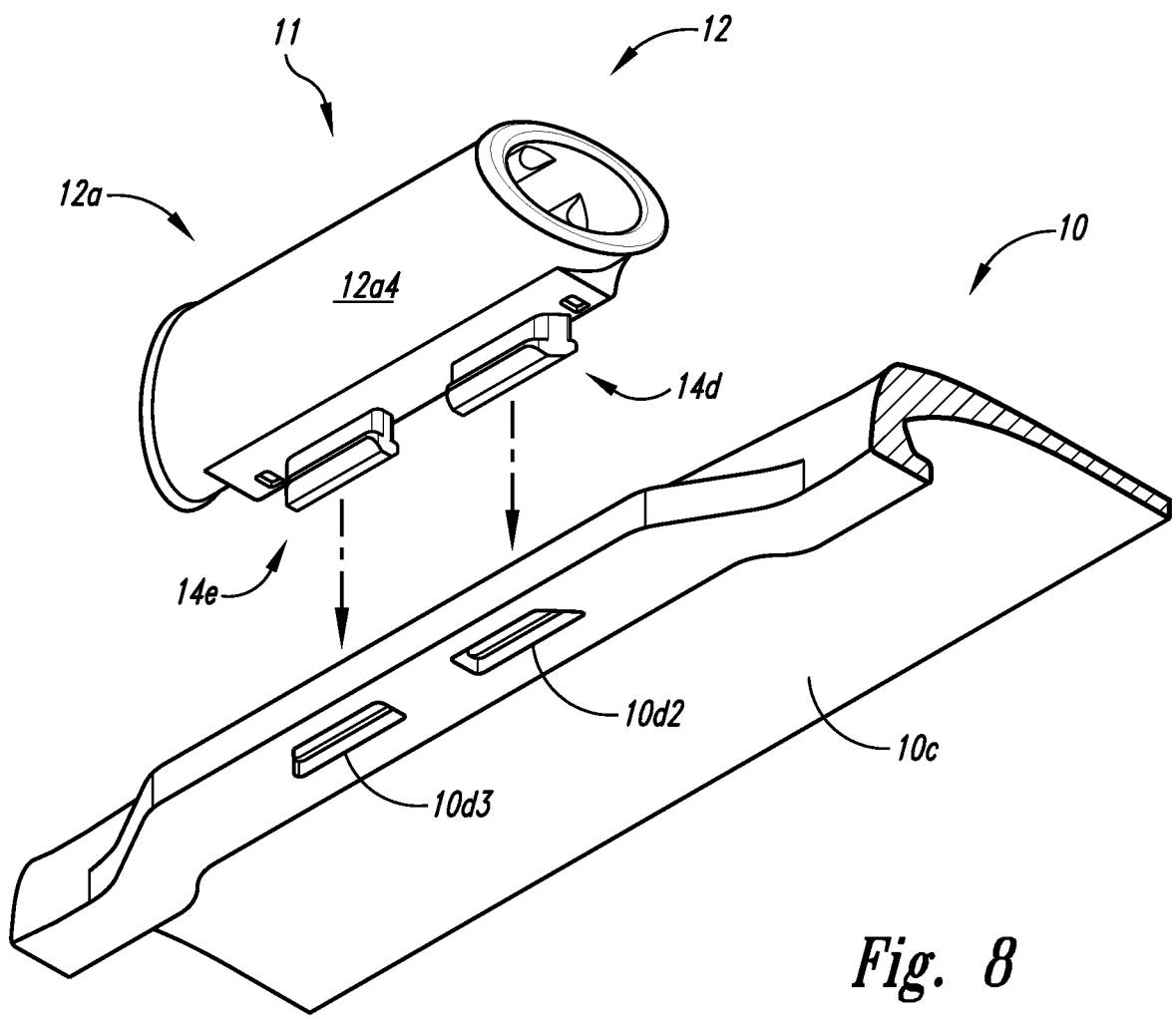
FIG. 8 is a bottom perspective view of the stylus coupling assembly including the stylus retention component and the stylus coupling assembly coupled together and to be coupled with the computing device case portion.

Turning to FIG. 8, depicted therein is a bottom perspective view of the stylus coupling assembly 11 shown to include the stylus retention component 12 and the stylus coupling assembly 11 coupled together and to be coupled with the computing device case portion 10.

Figure 9:
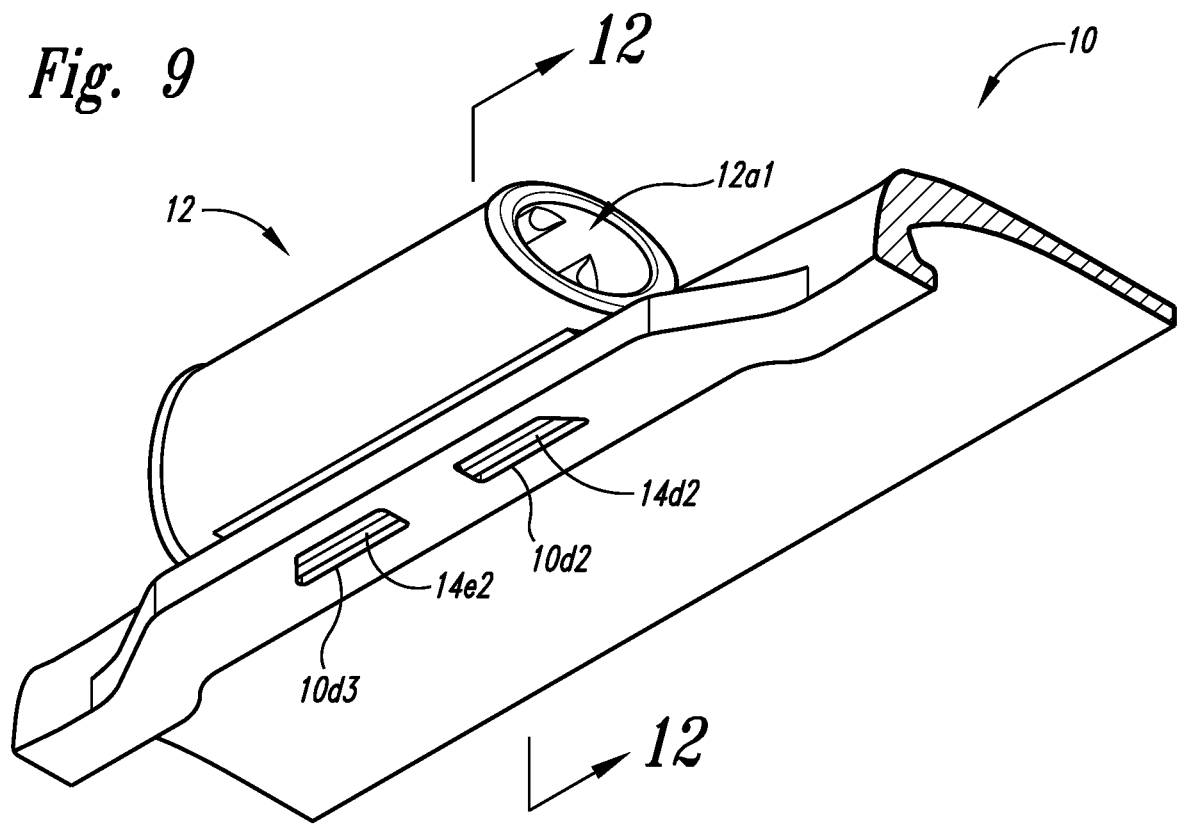
FIG. 9 is a bottom perspective view of the stylus coupling assembly including the stylus retention component and the engagement component coupled together and coupled with the computing device case portion.

Turning to FIG. 9, depicted therein is a bottom perspective view of the stylus coupling assembly 11 shown to include the stylus retention component 12 and the engagement component 14 coupled together and coupled with the computing device case portion 10.

Figure 10:
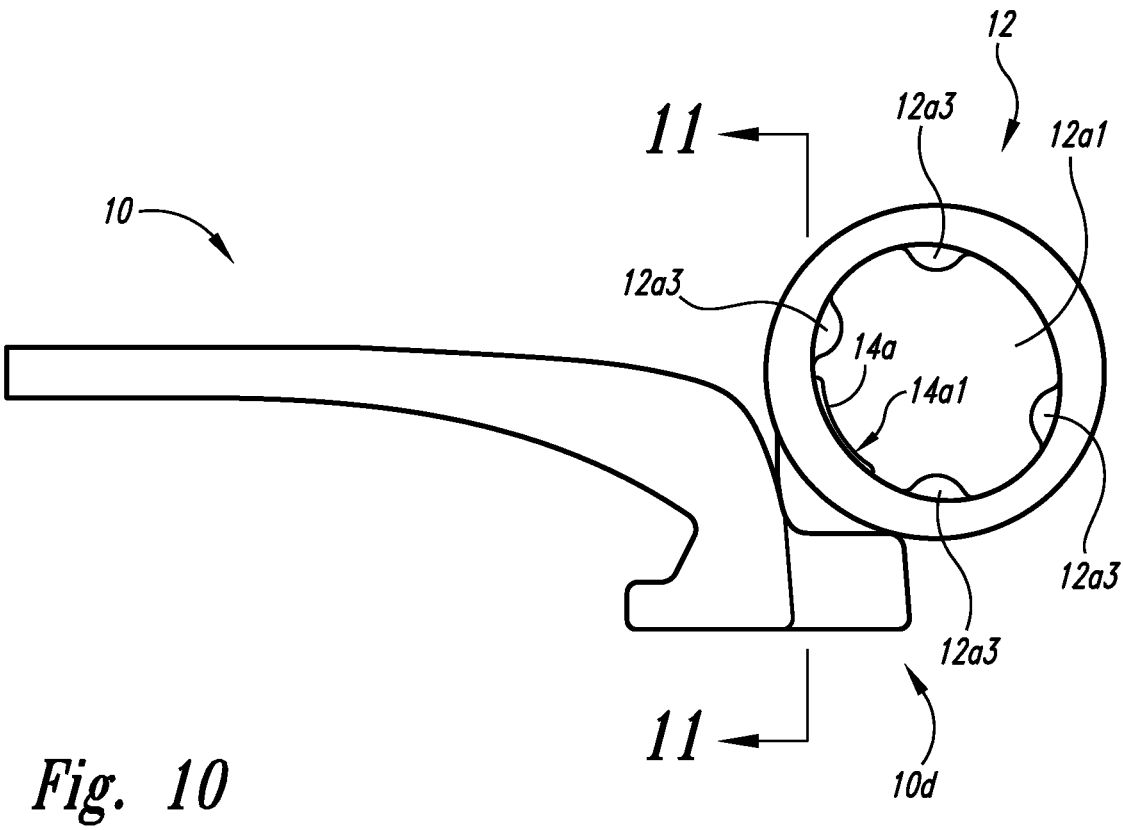
FIG. 10 is a side-elevational view of the stylus coupling assembly including the stylus retention component and the engagement component coupled together and coupled with the computing device case portion.

Turning to FIG. 10, depicted therein is a side-elevational view of the stylus coupling assembly 11 shown to include the stylus retention component 12 and the engagement component 14 coupled together and coupled with the computing device case portion 10.

Figure 11:
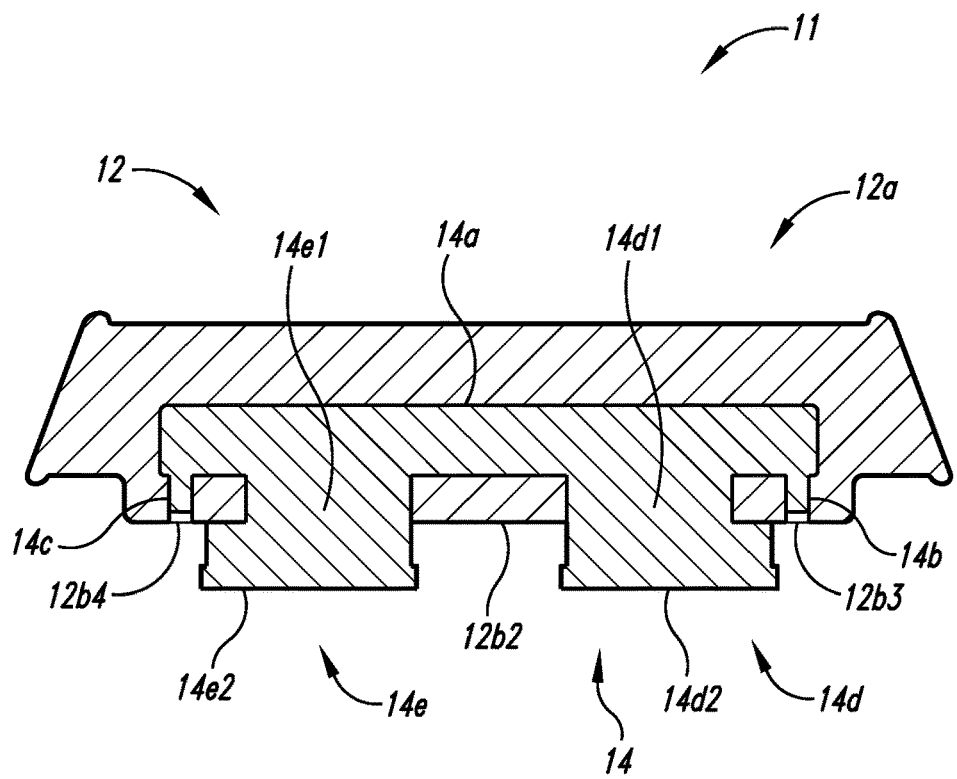
FIG. 11 is a cross-sectional side-elevational view of the stylus coupling assembly including the stylus retention component and the engagement component coupled together and coupled with the computing device case portion taken along the 11-11 cut line of FIG. 10.

Turning to FIG. 11, depicted therein is a cross-sectional side-elevational view of the stylus coupling assembly 11 shown to include the stylus retention component 12 and the engagement component 14 coupled together and coupled with the computing device case portion 10 taken along the 11-11 cut line of FIG. 10.

Figure 12:
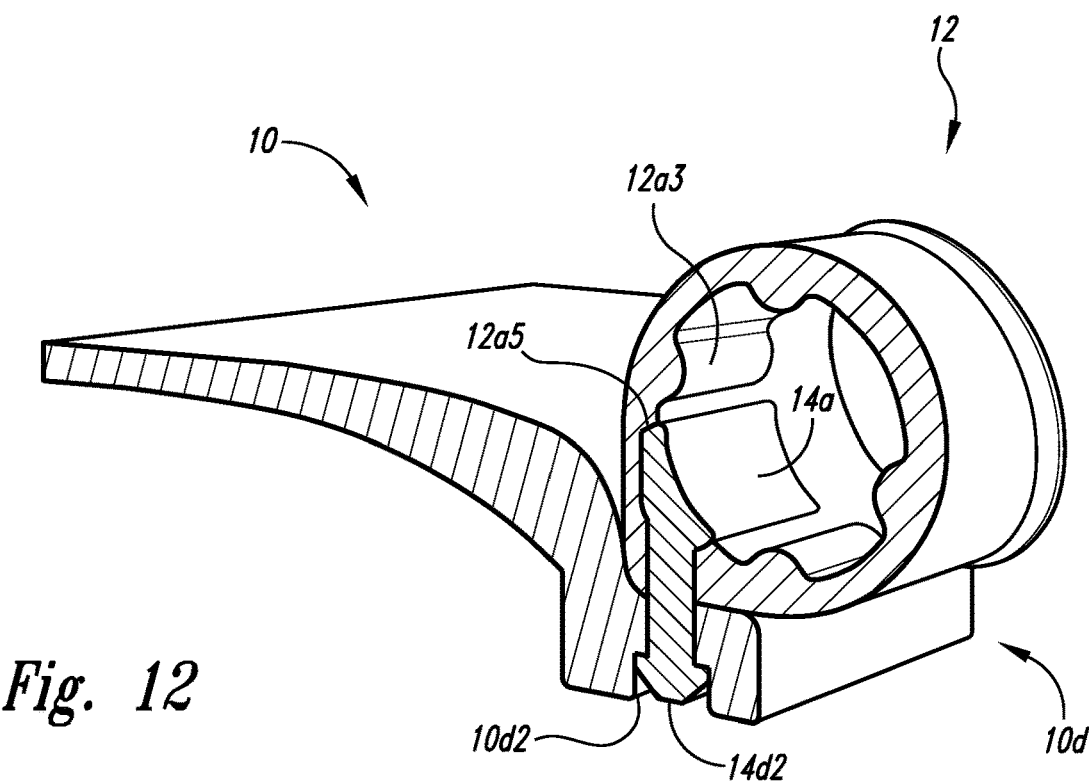
FIG. 12 is a cross-sectional perspective view of the stylus coupling assembly including the stylus retention component and the engagement component coupled together and coupled with the computing device case portion taken along the 12-12 cut line of FIG. 9.

Turning to FIG. 12, depicted therein is a cross-sectional perspective view of the stylus coupling assembly 11 shown to include the stylus retention component 12 and the engagement component 14 coupled together and coupled with the computing device case portion 10 taken along the 12-12 cut line of FIG. 9.

Figure 13:
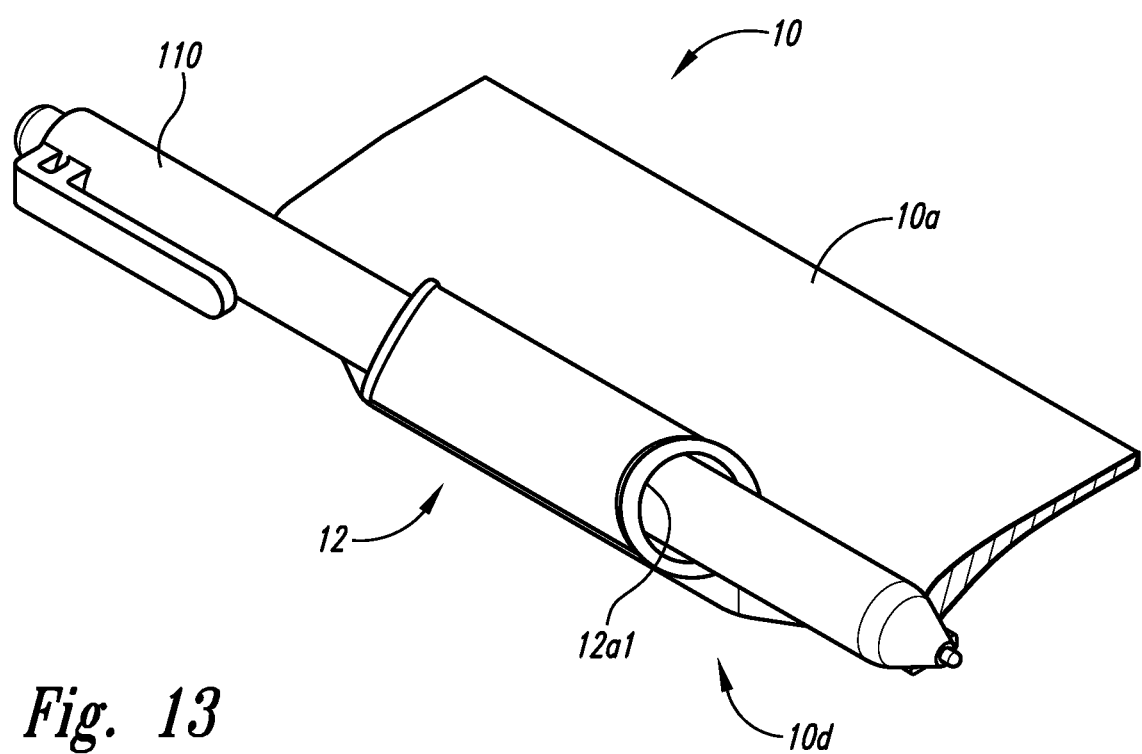
FIG. 13 is a top perspective view of the stylus coupling assembly including the stylus retention component and the engagement component coupled together and coupled with the computing device case portion and with the stylus retention component shown holding a stylus-shaped computer input device.

Turning to FIG. 13, depicted therein is a top perspective view of the stylus coupling assembly 11 shown to include the stylus retention component 12 and the engagement component 14 coupled together and coupled with the computing device case portion 10 and with the stylus retention component 12 shown holding a stylus-shaped computer input device 110.

As shown by one or more of FIGS. 1-13, implementations of stylus coupling assembly 11 can couple at least one stylus-shaped computer input device 110 to at least one computing device case portion 10, the stylus coupling assembly 11 can include stylus retention component 12, which can be couplable with the stylus-shaped computer input device 110; and can include engagement component 14, which can include engagement projection 14*d*, which can be couplable with the stylus retention component 12 and with the computing device case portion 10.

In implementations, the stylus retention component 12 can include elongated hollow member 12*a*, which can include opening 12*a*1, which can be sized to receive at least one stylus-shaped computer input device 110.

In implementations, the elongated hollow member 12*a* of the stylus retention component 12 can include elongated rib member 12*a*3 and interior surface 12*a*2, the elongated rib member 12*a*3 can be extended from the interior surface 12*a*2 along a longitudinal direction of the elongated hollow member 12*a*.

In implementations, the elongated hollow member 12*a* of the stylus retention component 12 can include elongated groove 12*a*5, which can be extended from the interior surface 12*a*2 along a longitudinal direction of the elongated hollow member 12*a*.

In implementations, the stylus retention component 12 can include interfacial surface 12*b*2 and receiving aperture 12*b*5, which can be extended between the elongated groove 12*a*5 of the elongated hollow member 12*a* and the interfacial surface 12*b*2.

In implementations, the interfacial surface 12*b*2 of the stylus retention component 12 is shaped to conform with at least one surface of the at least one computing device case portion 10. The interfacial surface 12*b*2 of the stylus retention component 12 includes by is not limited to a substantially planar surface.

In implementations, the engagement component 14 of the stylus coupling assembly 11 can include elongated member 14*a*, which can be shaped and sized to be received by the elongated groove 12*a*5 of the stylus retention component 12.

In implementations, the elongated member 14*a* of the engagement component 14 can include elongated surface 14*a*1 and the interior surface 12*a*2 of the elongated hollow member 12*a* can include a radius of curvature. The elongated surface 14*a*1 of the elongated member 14*a* can include a first radius of curvature, and wherein the interior surface 12*a*2 of the elongated hollow member 12*a* can include a second radius of curvature, the first radius of curvature of the elongated surface 14*a*1 of the elongated member 14*a* can be substantially equal to the second radius of curvature of the interior surface 12*a*2 of the elongated hollow member 12*a*.

In implementations, the elongated member 14*a* of the engagement component 14 can include a first longitudinal length dimension, the elongated member 14*a*, which can be shaped to extend substantially along the first longitudinal length dimension. The engagement component 14 can include engagement projection 14*d*, which can extend from the elongated member 14*a* along a second length dimension substantially perpendicular to the first longitudinal length dimension of the elongated member 14*a*.

In implementations, the receiving aperture 12*b*5 of the stylus retention component 12 can be sized and shaped to receive the engagement projection 14*d* to extend through the receiving aperture 12*b*5 along a third longitudinal length dimension of the receiving aperture 12*b*5. The second longitudinal length dimension of the engagement projection 14*d* can be greater than the third longitudinal length dimension of the receiving aperture 12b5 to allow for a portion of the engagement projection 14d to extend past the interfacial surface 12b2 of the stylus retention component 12, the engagement projection 14d can be configured to couple with the computing device case portion 10.

In implementations, the engagement projection 14d of the engagement component 14 can include stem 14d1 and can include notch 14d4, the notch 14d4 can extend substantially perpendicularly from the interfacial surface 14a2 of the elongated member 14a along a length dimension greater than or equal to the third longitudinal length dimension of the receiving aperture 12b5.

In implementations, the engagement projection 14d of the engagement component 14 can include stem 14d1, which can include beveled end 14d2 with orthogonal extension 14d3 being perpendicular to stem 14d1.

In implementations, the stylus retention component 12 can be made from at least one material having a property of hardness that can be measured to be at least one first hardness measurement value and the engagement component 14 can be made from at least one material having a property of hardness that can be measured to be at least one second hardness measurement value, the at least one first hardness measurement value being smaller than the at least one second hardness measurement value.

In implementations, the stylus retention component 12 can be made from at least one silicone material and the engagement component 14 can be made from at least one polycarbonate material.

In implementations, the stylus retention component 12 can include interfacial surface 12b2 and guide aperture 12b3, which can be extended a first length dimension between elongated groove 12a5 of elongated hollow member 12a and interfacial surface 12b2, and wherein the engagement component 14 can include elongated member 14a and guide peg 14b. The guide peg 14b can extend longitudinally from the elongated member 14a a second length dimension. The first length dimension of the guide aperture 12b3 can be greater than or equal to the second length dimension of the guide peg 14b. The guide aperture 12b3 can be sized and positioned to receive the guide peg 14b as the stylus retention component 12 is being coupled with the engagement component 14.

The elongated hollow member 12a can be substantially cylindrical in shape.

Implementations of stylus retention component 12 can be for coupling with at least one stylus-shaped computer input device 110 and for coupling with engagement component 14, which can include engagement projection 14d.

The stylus retention component 12 can include elongated hollow member 12a, which can include opening 12a1, which can be sized to receive the stylus-shaped computer input device 110. The elongated hollow member 12a can include interior surface 12a2, which can include elongated groove 12a5.

In implementations, the stylus retention component 12 can include receiver portion 12b, which can include receiving aperture 12b5 and interfacial surface 12b2, wherein the receiving aperture 12b5 can extend between the elongated groove 12a5 of the elongated hollow member 12a and the interfacial surface 12b2 of the elongated hollow member 12a. The receiving aperture 12b5 can be sized to receive the engagement projection 14d of the engagement component 14.

Implementations of engagement component 14 can be for coupling with stylus retention component 12 and for coupling with at least one stylus-shaped computer input device 110. The stylus retention component 12 can include elongated hollow member 12a and receiver portion 12b. The elongated hollow member 12a can include opening 12a1 and interior surface 12a2. The interior surface 12a2 can include elongated groove 12a5. The receiver portion 12b can include interfacial surface 12b2 and receiving aperture 12b5, which can extend from elongated groove 12a5 of elongated hollow member 12a to interior surface 12a2 of receiver portion 12b.

In implementations, the engagement component 14 can include elongated member 14a, which can include elongated surface 14a1 and interfacial surface 14a2. The elongated member 14a can extend substantially along a first longitudinal length dimension. The elongated member 14a can be sized and shaped to be received by the elongated groove 12a5 of the at least one elongated hollow member 12a.

In implementations, the engagement component 14 can include engagement projection 14d, which can extend from the elongated member 14a along a second length dimension substantially perpendicular to the first longitudinal length dimension of the elongated member 14a. The engagement projection 14d can be sized and shaped to be received by and extend through the receiving aperture 12b5 of the stylus retention component 12.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A stylus coupling assembly to couple at least one stylus-shaped computer input device to at least one computing device case portion, the stylus coupling assembly comprising: a stylus retention component being couplable with the stylus-shaped computer input device; wherein the stylus retention component includes at least one receiving aperture and
   an engagement component including at least one engagement projection, the at least one engagement projection being couplable with the stylus retention component and with the computing device case portion,
   wherein the stylus retention component includes an elongated hollow member including at least one opening, the at least one opening being sized to receive the at least one stylus-shaped computer input device,
   wherein the elongated hollow member of the stylus retention component includes at least one elongated groove being extended from the interior surface along a longitudinal direction of the elongated hollow member,
   wherein the engagement component of the stylus coupling assembly includes elongated member, the elongated member being shaped and sized to be received by the elongated groove of the stylus retention component,
   wherein the elongated member of the engagement component includes a first longitudinal length dimension, the elongated member being shaped to extend substantially along the first longitudinal length dimension, and wherein the engagement component includes at least one engagement projection, the at least one engagement projection extending from the elongated member along a second length dimension substantially perpendicular to the first longitudinal length dimension of the elongated member, and wherein the at least one receiving aperture of the stylus retention component being sized and shaped to receive the at least one engagement projection to extend through the at least one receiving aperture along a third longitudinal length dimension of the at least one receiving aperture, the second longitudinal length dimension of the at least one engagement projection being greater than the third longitudinal length dimension of the at least one receiving aperture to allow for a portion of the at least one engagement projection to extend past the interfacial surface of the stylus retention component, the at least one engagement projection configured to couple with the at least one computing device case portion.

2. The stylus coupling assembly of claim 1 wherein the elongated hollow member of the stylus retention component includes at least one elongated rib member and an interior surface, the at least one elongated rib member being extended from the interior surface along a longitudinal direction of the elongated hollow member.

3. The stylus coupling assembly of claim 1 wherein the stylus retention component includes an interfacial surface, the at least one receiving aperture being extended between the elongated groove of the elongated hollow member and the interfacial surface.

4. The stylus coupling assembly of claim 3 wherein the interfacial surface of the stylus retention component is shaped to conform with at least one surface of the at least one computing device case portion.

5. The stylus coupling assembly of claim 4 wherein the interfacial surface of the stylus retention component includes by is not limited to a substantially planar surface.

6. The stylus coupling assembly of claim 1 wherein the engagement component of the stylus coupling assembly includes elongated member, the elongated member being shaped and sized to be received by the elongated groove of the stylus retention component.

7. The stylus coupling assembly of claim 6 wherein the elongated member of the engagement component includes an elongated surface and the interior surface of the elongated hollow member includes a radius of curvature, the elongated surface of the elongated member including a first radius of curvature, and wherein the interior surface of the elongated hollow member includes a second radius of curvature, the first radius of curvature of the elongated surface of the elongated member being substantially equal to the second radius of curvature of the interior surface of the elongated hollow member.

8. The stylus coupling assembly of claim 1 wherein the at least one engagement projection of the engagement component includes at least one stem and including at least one notch, the at least one notch extending substantially perpendicularly from the interfacial surface of the elongated member along a length dimension greater than or equal to the third longitudinal length dimension of the at least one receiving aperture.

9. The stylus coupling assembly of claim 1 wherein the at least one engagement projection of the engagement component includes at least one stem including at least one beveled end with at least one orthogonal extension being perpendicular to the at least one stem.

10. The stylus coupling assembly of claim 1 wherein the stylus retention component is made from at least one material having a property of hardness that can be measured to be at least one first hardness measurement value and the engagement component is made from at least one material having a property of hardness that can be measured to be at least one second hardness measurement value, the at least one first hardness measurement value being smaller than the at least one second hardness measurement value.

11. The stylus coupling assembly of claim 1 wherein the stylus retention component is made from at least one silicone material and the engagement component is made from at least one polycarbonate material.

12. The stylus coupling assembly of claim 1 wherein the stylus retention component includes an interfacial surface and at least one guide aperture, the at least one guide aperture being extended a first length dimension between the elongated groove of the elongated hollow member and the interfacial surface, and wherein the engagement component includes at least one elongated member and at least one guide peg, the guide peg extending longitudinally from the elongated member a second length dimension, the first length dimension of the at least one guide aperture being greater than or equal to the second length dimension of the at least one guide peg, the at least one guide aperture being sized and positioned to receive the at least one guide peg as the stylus retention component is being coupled with the engagement component.

13. The stylus coupling assembly of claim 1 wherein the elongated hollow member is substantially cylindrical in shape.

14. An engagement component for coupling with a stylus retention component and for coupling with at least one stylus-shaped computer input device, the stylus retention component including an elongated hollow member and a receiver portion, the at least one elongated hollow member including an opening and an interior surface, the interior surface including an elongated groove, the receiver portion including an interfacial surface and at least one receiving aperture extending from the elongated groove of the elongated hollow member to the interior surface of the receiver portion, the engagement component comprising: an elongated member including at least one elongated surface and at least one interfacial surface, the elongated member extending substantially along a first longitudinal length dimension, the elongated member sized and shaped to be received by the elongated groove of the at least one elongated hollow member; and at least one engagement projection extending from the elongated member along a second length dimension substantially perpendicular to the first longitudinal length dimension of the elongated member, the at least one engagement projection sized and shaped to be received by and extend through the at least one receiving aperture of the stylus retention component.

15. The engagement component of claim 14 wherein the engagement component is made from at least one polycarbonate material.

\* \* \* \* \*